United States Patent
Burton et al.

(10) Patent No.: US 10,525,694 B2
(45) Date of Patent: Jan. 7, 2020

(54) SYSTEM FOR PREPARING THREE-DIMENSIONAL (3D) OBJECTS FOR SURFACE PRINTING

(71) Applicant: Xerox Corporation, Norwalk, CT (US)

(72) Inventors: Kelly J. Burton, Rochester, NY (US); Elizabeth M. Crossen, Churchville, NY (US); Sean P. Lillis, Jr., Webster, NY (US); Annie Liu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 400 days.

(21) Appl. No.: 15/375,555

(22) Filed: Dec. 12, 2016

(65) Prior Publication Data

US 2018/0162064 A1 Jun. 14, 2018

(51) Int. Cl.
*B33Y 40/00* (2015.01)
*B33Y 10/00* (2015.01)
*B33Y 30/00* (2015.01)
*B29C 64/20* (2017.01)
*B29C 64/35* (2017.01)

(52) U.S. Cl.
CPC .............. *B33Y 40/00* (2014.12); *B29C 64/20* (2017.08); *B29C 64/35* (2017.08); *B33Y 10/00* (2014.12); *B33Y 30/00* (2014.12)

(58) Field of Classification Search
CPC ......... B33Y 10/00; B33Y 50/02; B33Y 30/00; B33Y 80/00; B29C 64/106; B29C 64/386; B29C 64/40; B29C 64/20; B29C 64/124
See application file for complete search history.

(56) References Cited

U.S. PATENT DOCUMENTS

| | | |
|---|---|---|
| 2002/0134257 A1 | 9/2002 | Stephenson |
| 2002/0191036 A1 | 12/2002 | Park |
| 2009/0231404 A1* | 9/2009 | Niekawa ................ B41J 11/002 347/102 |
| 2013/0019566 A1* | 1/2013 | Schach .................. B41J 2/0057 53/411 |
| 2015/0158310 A1 | 6/2015 | Olejniczak et al. |
| 2015/0224765 A1 | 8/2015 | Fukasawa |
| 2015/0273864 A1* | 10/2015 | Moehringer ........... B41J 11/002 347/16 |
| 2017/0087632 A1* | 3/2017 | Mark .................... B22D 31/002 |
| 2018/0162064 A1* | 6/2018 | Burton .................. B33Y 10/00 |

* cited by examiner

*Primary Examiner* — Alison L Hindenlang
*Assistant Examiner* — Debjani Roy
(74) *Attorney, Agent, or Firm* — Maginot Moore & Beck LLP

(57) ABSTRACT

A printing system treats the surface of three-dimensional objects to be printed to improve the printing of the articles of manufacture. The system includes a surface treatment module that is positioned to part of the printing process and to treat the object surfaces prior to the surfaces being printed. The treatment of the surfaces within the module include operating an abrasive device to remove material from an object surface and to apply solvent to the object surface to clean the surface.

20 Claims, 9 Drawing Sheets

SYSTEM FOR PREPARING THREE-DIMENSIONAL (3D) OBJECTS FOR SURFACE PRINTING

TECHNICAL FIELD

This disclosure relates generally to a system for printing on three-dimensional (3D) objects, and more particularly, to systems for preparing a surface of such objects for printing.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

Prior to printing these three-dimensional objects, the surface of the object requires treatment to enable a smooth, durable image to be formed on the surface. Low cost surface treatments include hand buffing, an isopropyl alcohol (IPA) or solvent wipe, followed by surface drying. More expensive operations include plasma, corona, blown arc, and flame surface treatments. Both the low cost and more expensive surface preparation methods require a human operator to perform the operations. Including these treatments as part of the printing process and automating them would help remove the human variability in the results and avoid exposure of humans to solvents and other chemicals.

SUMMARY

A new printing system is configured to prepare the surface of three-dimensional (3D) objects and then feed the prepare objects to the printing process. The printing system includes a plurality of printheads, each printhead in the plurality of printheads being configured to eject marking material, a support member positioned to be parallel to a plane formed by the plurality of printheads, a member movably mounted to the support member, an actuator operatively connected to the movably mounted member to enable the actuator to move the moveably mounted member along the support member, an object holder configured to mount to the movably mounted member to enable the object holder to pass the plurality of printheads as the moveably mounted member moves along the support member, a surface treatment module configured to treat a surface of an object held by the object holder prior to the object holder passing the plurality of printheads, and a controller operatively connected to the plurality of printheads, the actuator, and the surface treatment module. The controller is configured to operate the actuator to move the object holder through the surface treatment module, to operate the surface treatment module to treat the surface of the object held by the object holder, to operate the actuator to pass the surface treated object past the plurality of printheads after the surface of the object has been treated, and to operate the plurality of printheads to eject marking material onto the object held by the object holder as the object holder passes the plurality of printheads.

A new method of printing the surface of three-dimensional (3D) objects includes operating an actuator with a controller to move an object holder mounted to a member that is movably mounted to a support member through a surface treatment module, operating the surface treatment module to treat the surface of the object held by the object holder, operating the actuator to pass the surface treated object past a plurality of printheads after the surface of the object has been treated, and operating the plurality of printheads to eject marking material onto the object held by the object holder as the object holder passes the plurality of printheads

BRIEF DESCRIPTION OF THE DRAWINGS

The foregoing aspects and other features of a printing system that prepares surfaces of 3D objects for printing are explained in the following description, taken in connection with the accompanying drawings.

DETAILED DESCRIPTION

Figure 1:
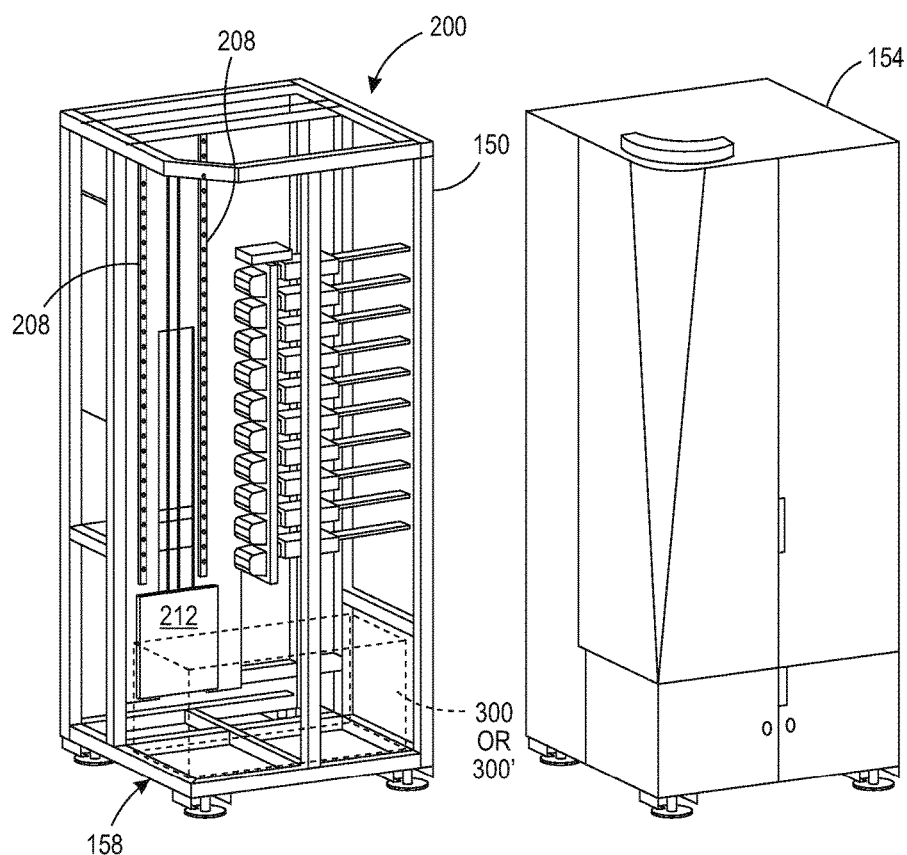
FIG. 1 illustrates an upright printing system within a cabinet having a module configured to prepare a surface of a 3D object for printing.

For a general understanding of the present embodiments, reference is made to the drawings. In the drawings, like reference numerals have been used throughout to designate like elements.

Figure 7:
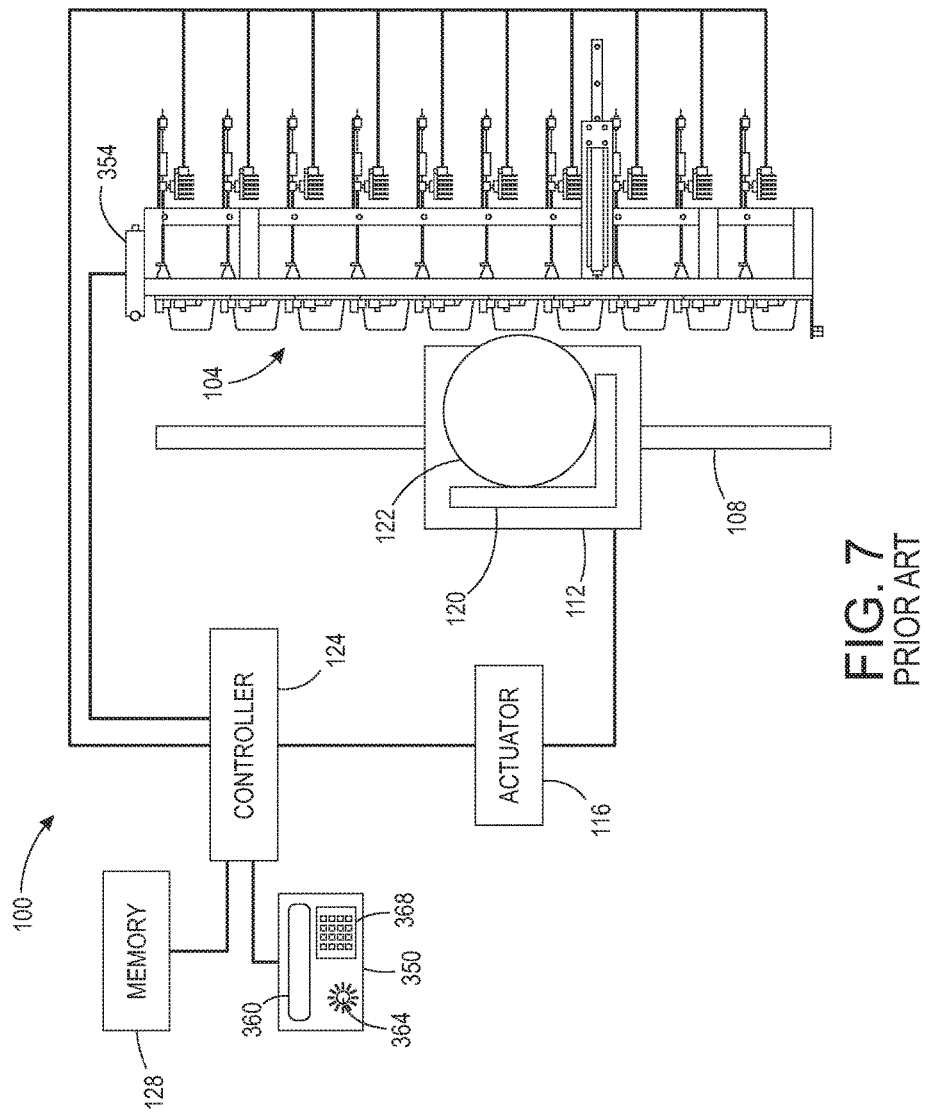
FIG. 7 illustrates a prior art upright printing system configured to print a surface of a 3D object for printing.

FIG. 7 illustrates a prior art printing system 100 configured to print on a 3D object. The printing system 100 includes an array of printheads 104, a support member 108, a member 112 movably mounted to the support member 108, an actuator 116 operatively connected to the movably mounted member 112, an object holder 120 configured to mount to the movably mounted member 112, and a controller 124 operatively connected to the plurality of printheads and the actuator. As shown in FIG. 7, the array of printheads 104 is arranged in a two-dimensional array, which in the figure is a 10 by 1 array, although other array configurations can be used. Each printhead is fluidly connected to a supply of marking material (not shown) and is configured to eject marking material received from the supply. Some of the printheads can be connected to the same supply or each printhead can be connected to its own supply so each printhead can eject a different marking material. The controller 124 is also operatively connected to an optical sensor 354.

The support member 108 is positioned to be parallel to a plane formed by the array of printheads and, as shown in the figure, is oriented so one end of the support member 108 is at a higher gravitational potential than the other end of the support member. This orientation enables the printing system 100 to have a smaller footprint than an alternative embodiment that horizontally orients the array of printheads and configures the support member, movably mounted member, and object holder to enable the object holder to pass objects past horizontally arranged printheads so the printheads can eject marking material downwardly on the objects.

The member 112 is movably mounted to the support member 108 to enable the member to slide along the support member. In some embodiments, the member 112 can move bi-directionally along the support member. In other embodiments, the support member 108 is configured to provide a return path to the lower end of the support member to form a track for the movably mounted member. The actuator 116 is operatively connected to the movably mounted member 112 so the actuator 116 can move the moveably mounted member 112 along the support member 108 and enable the object holder 120 connected to the moveably mounted member 112 to pass the array of printheads 104 in one dimension of the two-dimensional array of printheads. In the embodiment depicted in the figure, the object holder 120 moves a 3D object 122 along the length dimension of the array of printheads 104.

The controller 124 is configured with programmed instructions stored in a memory 128 operatively connected to the controller so the controller can execute the programmed instructions to operate components in the printing system 100. Thus, the controller 124 is configured to operate the actuator 116 to move the object holder 120 past the array of printheads 104 and to operate the array of printheads 104 to eject marking material onto objects held by the object holder 120 as the object holder passes the array of printheads 104. Additionally, the controller 124 is configured to operate the inkjets of the printheads within the array of printheads 104 to form images on a surface of the object 122.

The system configuration shown in FIG. 7 is especially advantageous in a number of aspects. For one, as noted above, the vertical configuration of the array of printheads 104 and the the support member 108 enables the system 100 to have a smaller footprint than a system configured with a horizontal orientation of the array and support member. This smaller footprint of the system enables the system 100 to be installed within a frame 150 that is housed in a single cabinet 154, as depicted in FIG. 1. Once installed, various object holders can be used with the system to print a variety of goods that are generic in appearance until printed. Additionally, the controller 124 can be configured with programmed instructions to operate the actuator 116 to move the object holder at speeds that attenuate the air turbulence in the gap between the printhead and the object surface printed by the system 100.

Figure 8:
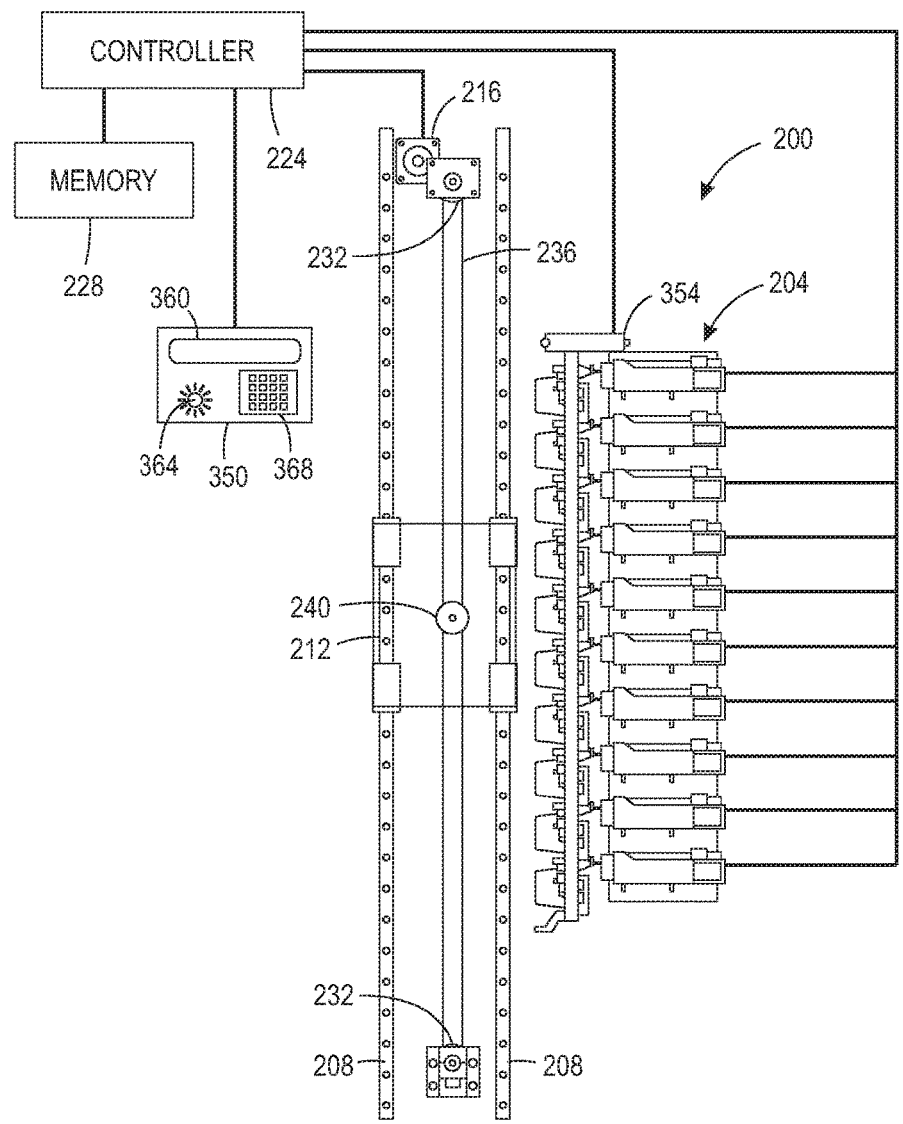
FIG. 8 is a prior art printing system that uses a double support member to enable movement of objects past the array of printheads in the system of FIG. 7.

An alternative embodiment of the system 100 is shown in FIG. 8. In this alternative embodiment 200, the support member is a pair of support members 208 about which the moveably mounted member 212 is mounted. This embodiment includes a pair of fixedly positioned pulleys 232 and a belt 236 entrained about the pair of pulleys to form an endless belt. The moveably mounted member 212 includes a third pulley 240 that engages the endless belt to enable the third pulley 240 to rotate in response to the movement of the endless belt moving about the pair of pulleys 232 to move the moveably mounted member and the object holder mounted to the member 212. In this embodiment, the actuator 216 is operatively connected to one of the pulleys 232 so the controller 224 can operate the actuator to rotate the driven pulley and move the endless belt about the pulleys 232. The controller 224 can be configured with programmed instructions stored in the memory 228 to operate the actuator 216 bi-directionally to rotate one of the pulleys 232 bi-directionally for bi-directional movement of the moveably mounted member 212 and the object holder mounted to the member past the array of printheads 204.

FIG. 1 depicts the system 200 of FIG. 8 installed within a frame 150 of an enclosure, such as cabinet 154. The movably mounted member 212 is at its lowest point of gravitational potential along the support member 208. At this position, the member 212 and any object held by the holder mounted to the member is not positioned where marking material can be ejected onto it by printhead array 204. Applicants have configured surface treatment modules 300 and 300', described more fully below, that fit within the space 158 of cabinet 154 that is below the printhead array 204. That is, the surface treatment modules are positioned within the enclosure at a location having a lower gravitational potential than the printhead array 204. Thus, these modules can treat surfaces of the object or objects held by the holder mounted to the member 212 before the surfaces are printed by the printhead array 204.

Figure 2:
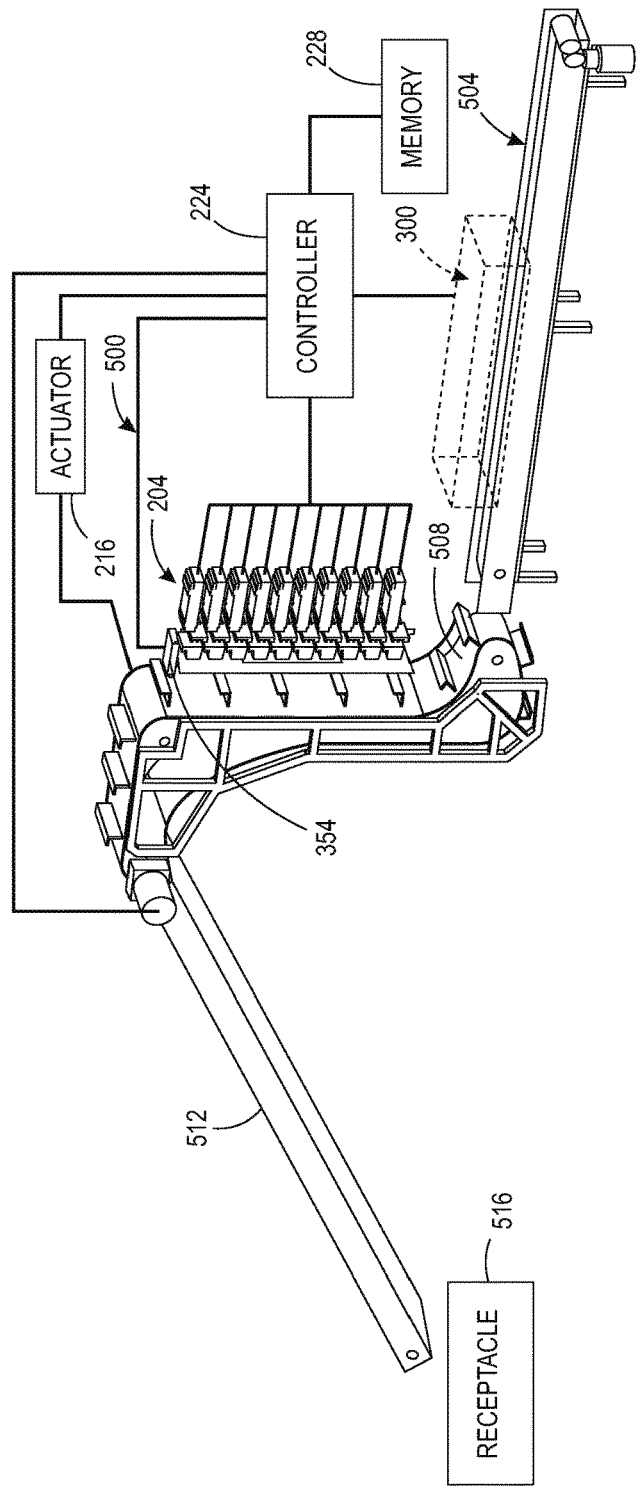
FIG. 2 is a horizontal printing system having a module configured to prepare a surface of a 3D object for printing.

While the printing system 100 described above is especially advantageous in environments having space constraints for the printing system, the system 500 depicted in FIG. 2 is more robust and useful in manufacturing environments. In system 500, a conveyor 504 is configured to deliver objects from a supply of objects (not shown) to an object holder 508. The object holder 508 is configured to receive objects from the conveyor 504. The controller 224 is operatively connected to the conveyor 504, the actuator 216, and the array of printheads 204. The controller 224 is further configured with programmed instructions stored in the memory 228 to operate the conveyor 504 to deliver objects to the object holders 508 and to operate the actuator 216 to move the objects held by the object holders past the array of printheads 204. This operation enables the printheads to print the objects as the objects pass the array of printheads 204. A bin 516 can be provided to receive the objects from the object holders 508 after the objects have been printed. In the embodiment shown in FIG. 2, however, another conveyor 512 is configured to receive objects from the object holders 508 after the objects held by the object holders are printed by the printheads in the array of printheads 204. The controller 224 is operatively connected to the conveyor 512 and operates the conveyor 512 to transport the printed objects to a location away from the printing system, such as a receptacle 516. Similar to the cabinet 154 discussed above, the surface treatment modules, such as module 300 shown in FIG. 1, can be positioned along the conveyor 504 to treat the surface of objects to be printed by the printhead array 204 before the objects are printed.

Figure 9A:
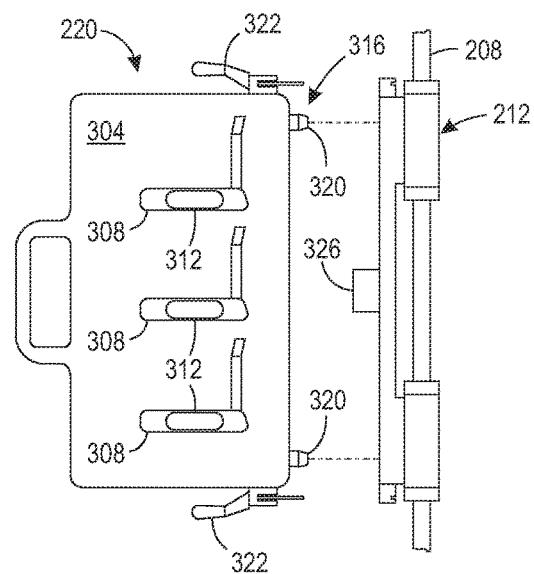
FIGS. 9A and 9B depict a prior art object holder configured to identified an object to be printed by a printing system.
Figure 9B:
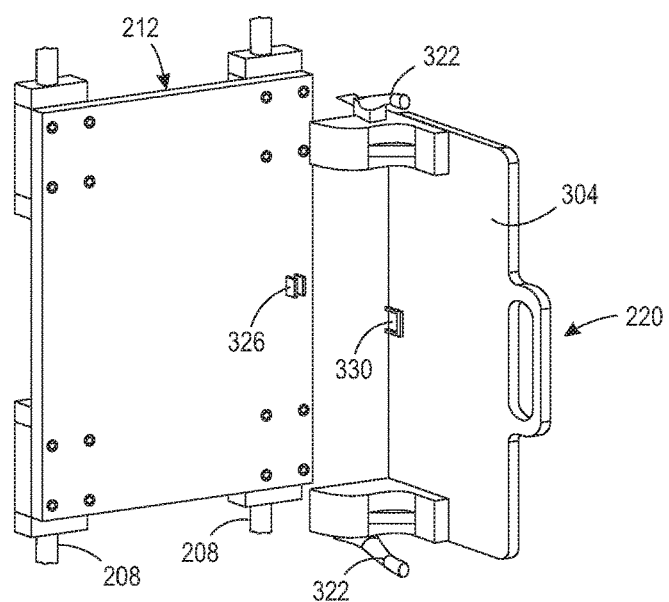

An example of an object holder 220 is shown in FIG. 9A and FIG. 9B. The object holder 220 includes a plate 304 having apertures 308 in which objects 312, which are golf club heads in the figure, are placed for printing. A latch 316 is configured for selectively mounting the object holder 220 to the movably mounted member 212. The latch 316 includes locating features 320 to aid in properly positioning the object holder 220 for securing the holder to the member 212, which is supported by members 208 as shown in FIG. 8. Once properly positioned, levers 322 operate the latch 316 to secure the holder 220 to the member 212. As shown in the figure, member 212 includes an input device 326 for obtaining an identifier from the object holder 220 as further described below.

A perspective view of the object holder 220 is shown in FIG. 9B. In that figure, an identification tag 330 on a surface of the object holder 220 faces the input device 326 on the movably mounted member 212 when the holder is secured to the member 212. The input device 326 is operatively connected to the controller 224, shown in FIG. 3, to communicate an identifier from the identification tag 330 to the controller. The controller is further configured to operate the array of printheads 204, the actuator 216, and the surface treatment modules, such as module 300, (FIG. 3) with reference to the identifier received from the input device 326 of the movably mounted member 212. As used in this document, "identification tag" means machine-readable indicia that embodies information to be processed by the printing system. The indicia can be mechanical, optical, or electromagnetic. In one embodiment, the identification tag 330 is a radio frequency identification (RFID) tag and the input device 326 of the movably mounted member is a RFID reader. In another embodiment, the identification tag 330 is a bar code and the input device 326 of the movably mounted member 212 is a bar code reader. In another embodiment in which mechanical indicia are used for the identification tag, the indicia are protrusions, indentations, or combinations of protrusions and indentations in a material that can be read by a biased arm following the surface of the identification tag. The input device 326 in such an embodiment can be a cam follower that converts the position of an arm that follows the mechanical features into electrical signals. The controller of the printing system receives the data embodied in the identification tag and uses this data to operate the surface treatment modules 300 and 300' that are incorporated in the printing systems shown in FIG. 1 and FIG. 2.

The controller of the printing system is also configured with programmed instructions stored in the memory 228 to compare the identifier received from the input device 326 of the movably mounted member 212 to identifiers stored in the memory 328 operatively connected to the controller. The controller disables operation of the actuator 216, the printhead array 204, the surface treatment module 300, or all three, in response to the identifier received from the input device 326 failing to correspond to one of the identifiers stored in the memory. The controller of the printing system is operatively connected to a user interface 350 as shown in FIG. 7 and FIG. 8. The interface 350 includes a display 360, an annunciator 364, and an input device 368, such as a keypad. The controller 224 is configured with programmed instructions to operate the user interface to notify an operator of the failure of the identifier received from the input device 326 to correspond to one of the identifiers in memory. Thus, the operator is able to understand the reason for the disabling of the system. The user interface 350 includes a display 360 for alphanumeric messages, a keypad 368 for entry of data by an operator, and an annunciator 364, such as a warning light or audible alarm, to attract attention to displayed messages. The controller 224 also uses the identifier to control the operation of the surface treatment module. For example, the controller 224 can use the identifier to control the length of time an object surface is subjected to an abrasive, polishing, or chemical cleaning operation.

Figure 3:
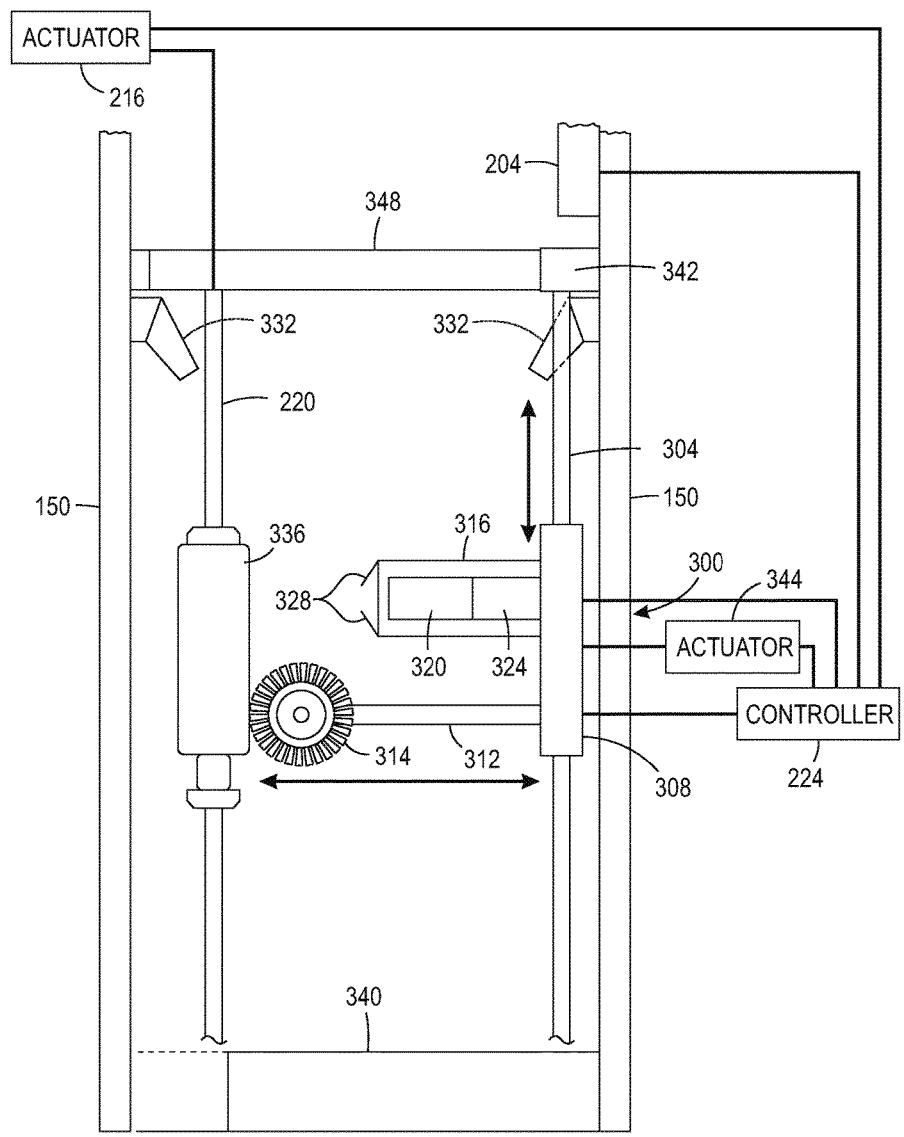
FIG. 3 depicts one embodiment of the module configured to prepare a surface of a 3D object for printing.

A surface treatment module 300 that can be incorporated with the system 200 in the cabinet 154 is shown in FIG. 3. As used in this document, the words "treat" and "treatment" mean an operation performed on an object surface to alter or modify a property of the surface to enhance the ability of the surface to receive marking material ejected by the printheads. The module 300 includes a support member 304 to which a platform 308 is movably mounted. Mounted to the platform 308 are retractable arms 312 and 324. Each of the retractable arms has a fixed end and a moving end. An abrasive device 314 is mounted to the moving end of the retractable arm 312 and an applicator 320 is mounted to the moving end of retractable arm 324. As used in this document, the words "abrasive device" means an apparatus that treats an object surface by frictionally engaging the surface with a moving material. In FIG. 3, the abrasive device 314 is a rotating wheel that treats an object surface with material mounted to the wheel that rotates around the center of the wheel. Retractable arm 324 and applicator 320 are positioned within a housing 316 in FIG. 3. The housing 316 includes a pair of pivoting members 328, such as doors, that can be opened and closed by operating with a controller, such as controller 224, an actuator operatively connected to the members to enclose the applicator 320 within the housing 316 selectively. Although the housing 316 is depicted with a pair of pivoting members 328, it could be configured with a single pivoting member, such as a lid, to close the housing 316 selectively. Air nozzles 332 direct a stream of pressurized air towards the object 336 that is being treated within the module 300. The air nozzles 332 can be continuously supplied with a stream of pressurized air when the printing system 200 is powered or selectively supplied with a stream of pressurized air in response to an object being present in the module. The pressurized air stream from air nozzles 332 removes dirt and debris released from the surface of the object 336 by the material of the rotating wheel 314 so this released material can fall into the waste receptacle 340. In some embodiments, a vacuum source is pneumatically coupled to the receptacle 340 to pull debris into the receptacle. An air knife 342 forms an air curtain 348 between the module 300 and the printhead array 204 to prevent debris from the environment within the module 300 from entering the print zone opposite the printhead array 204. As used in this document, the term "air stream" means a steady flow of pressurized air that separates a first volume of space from a second volume of space.

Figure 4A:
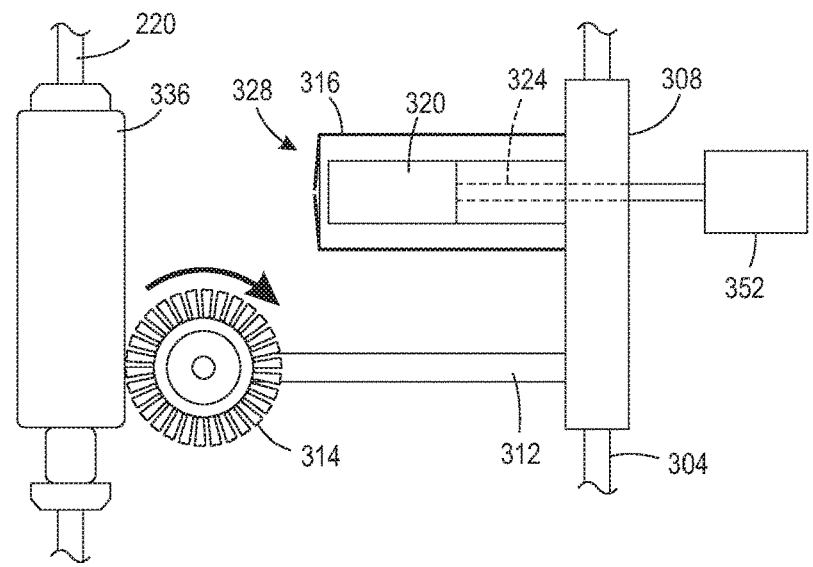
FIG. 4A and FIG. 4B depict operation of the module components shown in FIG. 3.
Figure 4B:
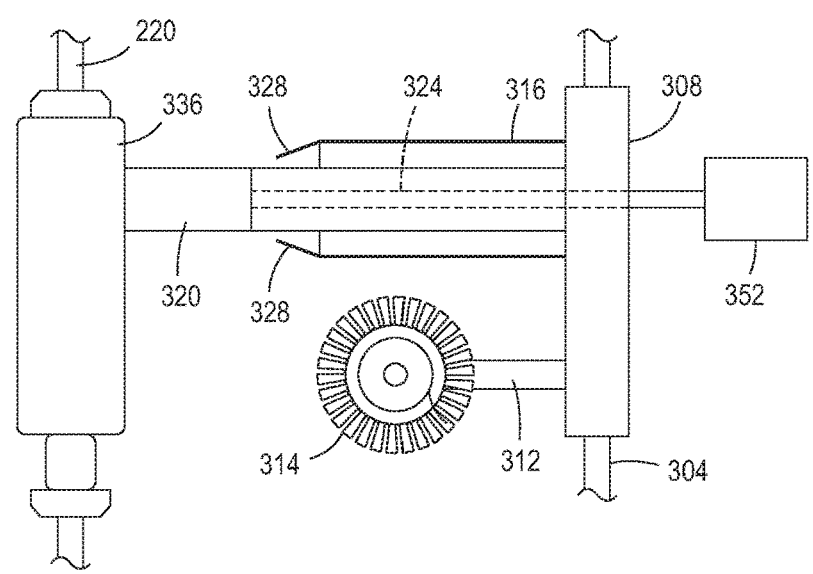

In FIG. 4A, the retractable arm 312 is extended to a position that enables the material on the rotating wheel 314 to engage the surface of the object 336 while the wheel 314 rotates. In some embodiments, the material mounted to the wheel is a buffing material, while in other embodiments, the material is a sanding material. Sanding materials are more abrasive than buffing materials. This engagement along with the rotation of the wheel 314 frictionally rubs the surface of the object with the material to buff, polish, or abrade the surface. The material on the wheel 314 can be relatively soft to polish the surface or it can be abrasive to remove burrs or other surface blemishes. During this treatment of the surface, the doors 328 of the housing 316 are closed to attenuate the risk of released debris from entering the housing and contaminating the applicator 320. The controller 224 can operate an actuator 344 (FIG. 3) to move the platform 308 bidirectionally along the support member 304 to enable the rotating wheel to treat the entire length of the object 336. After the surface of the object 336 has been treated by the rotating wheel 314, the controller operates the retractable arm 312 to pull the rotating wheel 314 towards the platform 308 and out of engagement with the object 336. The controller then operates an actuator to open the doors 328 of the housing 316 and operates the retractable arm 324 to move the applicator 320 into engagement with the surface of the object 336 as depicted in FIG. 4B. The applicator 320 is fluidly connected to a source of cleaning fluid 352. The cleaning fluid can be a solvent, such as isopropyl alcohol or the like. As the controller operates the actuator 344 to move the platform 308 bidirectionally along the support member 304, the applicator 320 applies the cleaning fluid to the surface of the object 336. This wiping action also helps remove debris and dirt from the surface of the object 336. After the surface of the object has been treated with the cleaning fluid from the applicator 320, the controller operates the retractable arm 324 to move the applicator 320 within the housing 320 and then the doors 328 are shut to enclose the applicator in the housing. The controller 224 can then operate the actuator 216 to move the object 336 through the air curtain 348 and out of the module 300 for printing.

Figure 5A:
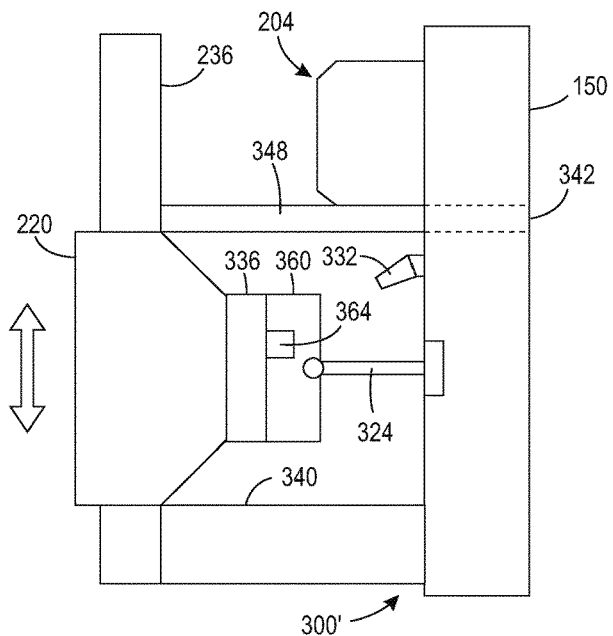
FIG. 5A to 5B depict operation of the components of an alternative embodiment of the module in FIG. 3.
Figure 5B:
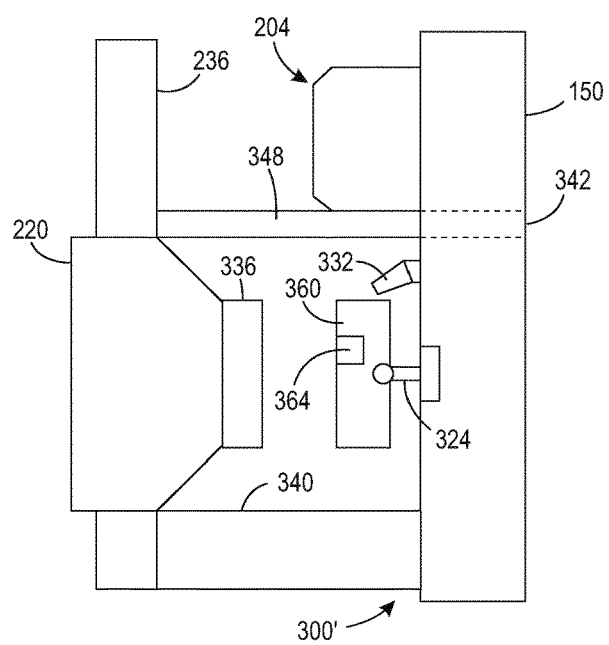

Another configuration of a cleaning module 300' is shown in FIG. 5A. This configuration is similar to the one of FIG. 4A in that it includes an air nozzle 332 that directs a stream of pressurized air towards the object 336 that is being treated within the module 300 to remove dirt and debris released from the surface of the object 336 so the released material can fall into the waste receptacle 340. The configuration 300' also includes air knife 342 to form an air curtain 348 between the module 300 and the printhead array 104 to prevent debris from the environment within the module 300 from entering the print zone opposite the printhead array 204. This configuration, however, does not include a solvent applicator 320. Instead, a sanding device 360, such as a rotating belt of abrasive material, is operatively connected to the moving end of retractable arm 324 that has its fixed end mounted to frame 150 within the cabinet 154. The controller operates the retractable arm 324 to engage the surface of the object 336 with the sanding device 360 as shown in FIG. 5A. To regulate the pressure applied to the surface of the object, the sanding device 360 includes a pressure sensor 364. The pressure sensor 364 generates an electrical signal indicative of a pressure applied by the sanding device 360 to the object 336. This signal is provided to the controller to enable the controller to monitor the signal and use it to regulate the operation of the retractable arm 324 to maintain a pressure against the object within a predetermined range. After the sanding of the surface is completed, the controller operates the retractable arm 324 to disengage the sanding device 360 from the object 336 as shown in FIG. 5B. The controller 224 can then operate the actuator 216 to move the object 336 through the air curtain 348 for printing by the printhead array 204.

Figure 6:
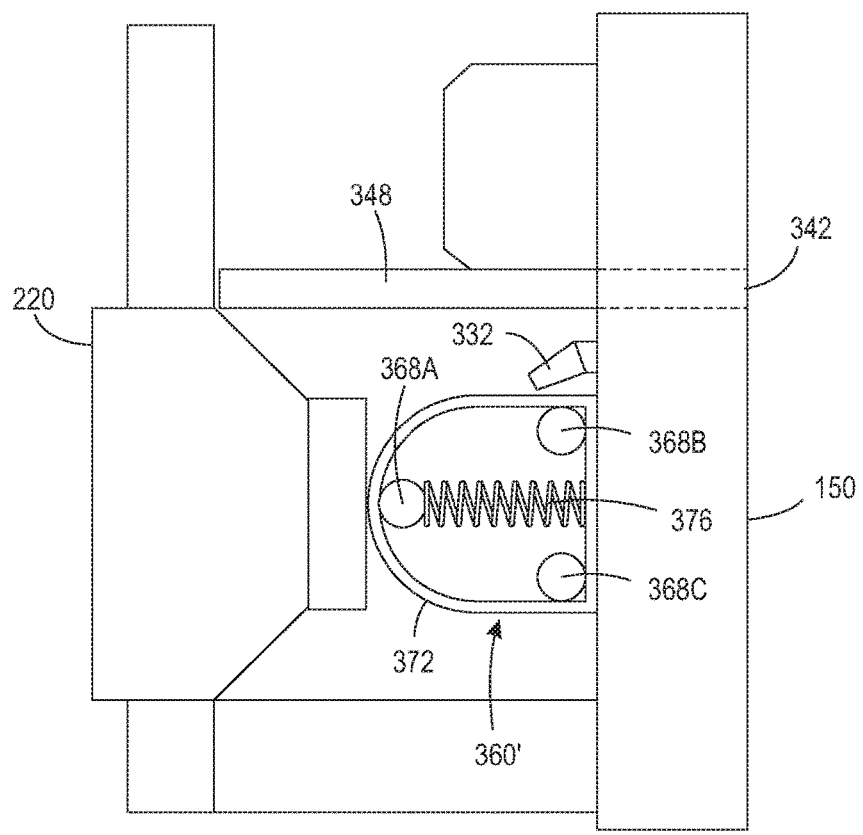
FIG. 6 depicts an alternative embodiment of the sanding device shown in the module of FIGS. 5A and 5B.

An alternative embodiment of the sanding device 360' is shown in FIG. 6. In this configuration, no retractable arm is provided. The sanding device 360' includes three rollers 368a, 368b, and 368c about which the endless belt 372 is entrained. At least one of these rollers is driven by an actuator operated by the controller. Roller 368a is operatively connected to a biasing member 376 positioned between the roller 368a and the frame 150. The point of engagement between the sanding device 360' and the object 336 is the portion of the belt between roller 368a and the object. As the surface of the object changes in response to the sanding, the biasing member continues to push against the object surface to maintain the belt 372 against the object 336. As the object holder 220 is moved by the controller operating the actuator, another portion of the object is positioned opposite the roller 368a and the biasing member 376 retracts or extends in response to the newly positioned surface. Thus, the embodiment 360' does not need the pressure sensor of device 360, but maintains a pressure of the belt on the surface of the object that corresponds to the biasing force of the member 376.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printing system comprising:
a plurality of printheads, each printhead in the plurality of printheads being configured to eject marking material;
a support member positioned to be parallel to a plane formed by the plurality of printheads;
a member movably mounted to the support member;
an actuator operatively connected to the movably mounted member to enable the actuator to move the moveably mounted member along the support member;
an object holder configured to mount to the movably mounted member to enable the object holder to pass the plurality of printheads as the moveably mounted member moves along the support member;
a surface treatment module configured to treat a surface of an object held by the object holder prior to the object holder passing the plurality of printheads, the surface treatment module having an abrasive device, the abrasive device being configured to engage the surface of the object held by the object holder selectively, the abrasive device comprising:
a retractable arm having a fixed end and a moving end;
a rotating wheel mounted to the moving end of the retractable arm;
an enclosure;
a frame configured to fit within the enclosure, the plurality of printheads, the support member, and the surface treatment module being arranged vertically within the frame to position the surface treatment module at a position that has a gravitational potential within the enclosure that is lower than a gravitational potential at the plurality of printheads; and
a controller operatively connected to the plurality of printheads, the actuator, and the retractable arm of the surface treatment module, the controller being configured to operate the actuator to move the object holder through the surface treatment module, to operate the surface treatment module to treat the surface of the object held by the object holder by operating the retractable arm to move a material mounted to the rotating wheel into contact with the surface of the object held by the object holder and to operate the retractable arm to move the material mounted to the rotating wheel out of contact with the surface of the object held by the object holder, to operate the actuator to pass the surface treated object past the plurality of printheads after the surface of the object has been treated, and to operate the plurality of printheads to eject marking material onto the object held by the object holder as the object holder passes the plurality of printheads.

2. The printing system of claim 1 further comprising:
a first conveyor configured to move objects to the object holder prior to the object holder passing the plurality of printheads; and
the surface treatment module is positioned along the first conveyor to enable the surface treatment module to treat the surface of each object prior to the objects being moved to the object holder.

3. The printing system of claim 1 wherein the material mounted to the rotating wheel is a buffing material or a sanding material.

4. The printing system of claim 1 further comprising:
at least one air nozzle configured to direct a stream of pressurized air towards the object to remove material released from the surface of the object; and
a receptacle positioned to receive the material removed by the stream of pressurized air from the at least one air nozzle.

5. The printing system of claim 4 further comprising:
an air knife positioned between the array of printheads and the abrasive device, the air knife being configured to form an air curtain between a volume in which the plurality of printheads is located and a volume within the surface treatment module.

6. The printing system of claim 1, the object holder further comprising:
an identification tag on a surface of the object holder that faces the movably mounted member;
the movably mounted member includes an input device for obtaining an identifier from the identification tag; and
the controller is operatively connected to the input device of the movably mounted member, the controller being further configured to operate the array of printheads, the actuator, and the surface treatment module with reference to the identifier received from the input device of the movably mounted member.

7. The printing system of claim 6 wherein the identification tag is a radio frequency identification (RFID) tag and the input device of the movably mounted member is a RFID reader.

8. The printing system of claim 6 wherein the identification tag is a bar code and the input device of the movably mounted member is a bar code reader.

9. A printing system comprising:
a plurality of printheads, each printhead in the plurality of printheads being configured to eject marking material;
a support member positioned to be parallel to a plane formed by the plurality of printheads;
a member movably mounted to the support member;
a first actuator operatively connected to the movably mounted member to enable the first actuator to move the moveably mounted member along the support member;
an object holder configured to mount to the movably mounted member to enable the object holder to pass the plurality of printheads as the moveably mounted member moves along the support member;
a surface treatment module configured to treat a surface of an object held by the object holder prior to the object holder passing the plurality of printheads, the surface treatment module having an abrasive device, the abrasive device being configured to engage the surface of the object held by the object holder selectively, the abrasive device comprising:
a sanding belt entrained about a plurality of rollers;
a second actuator operatively connected to at least one of the rollers;
a retractable arm having a moving end and a fixed end, the sanding belt being mounted to the moving end of the retractable arm;
a pressure sensor positioned to sense a pressure applied by the sanding belt to the object held by the object holder, the pressure sensor being configured to generate a signal indicative of the pressure applied by the sanding belt to the object;
an enclosure;
a frame configured to fit within the enclosure, the plurality of printheads, the support member, and the surface treatment module being arranged vertically within the frame to position the surface treatment module at a position that has a gravitational potential within the enclosure that is lower than a gravitational potential at the plurality of printheads; and
a controller operatively connected to the second actuator, the retractable arm, the pressure sensor, the plurality of printheads, and the first actuator, the controller being configured to operate the first actuator to move the object holder through the surface treatment module, to operate the surface treatment module to treat the surface of the object held by the object holder by operating the retractable arm to move the sanding belt into engagement with the object held by the object holder, operating the second actuator to rotate the sanding belt about the plurality of rollers, receiving the signal generated by the pressure sensor, operating the retractable arm to maintain the pressure applied by the sanding belt within a predetermined range, operating the retractable arm to disengage the sanding belt from the object held by the object holder, to operate the first actuator to pass the surface treated object past the plurality of printheads after the surface of the object has been treated, and to operate the plurality of printheads to eject marking material onto the object held by the object holder as the object holder passes the plurality of printheads.

10. The printing system of claim 9, the object holder further comprising:
an identification tag on a surface of the object holder that faces the movably mounted member;
the movably mounted member includes an input device for obtaining an identifier from the identification tag; and
the controller is operatively connected to the input device of the movably mounted member, the controller being further configured to operate the array of printheads, the first actuator, and the second actuator of the surface treatment module with reference to the identifier received from the input device of the movably mounted member.

11. The printing system of claim 10 further comprising:
at least one air nozzle configured to direct a stream of pressurized air towards the object to remove material released from the surface of the object; and
a receptacle positioned to receive the material removed by the stream of pressurized air from the at least one air nozzle.

12. A printing system comprising:
a plurality of printheads, each printhead in the plurality of printheads being configured to eject marking material;
a support member positioned to be parallel to a plane formed by the plurality of printheads;
a member movably mounted to the support member;
a first actuator operatively connected to the movably mounted member to enable the first actuator to move the moveably mounted member along the support member;
an object holder configured to mount to the movably mounted member to enable the object holder to pass the plurality of printheads as the moveably mounted member moves along the support member;

a surface treatment module configured to treat a surface of an object held by the object holder prior to the object holder passing the plurality of printheads, the surface treatment module having an abrasive device, the abrasive device being configured to engage the surface of the object held by the object holder selectively, the abrasive device comprising:
a sanding belt entrained about a plurality of rollers;
a second actuator operatively connected to at least one of the rollers;
a biasing member connected between one of the rollers and a frame, the biasing member being configured to maintain a pressure applied by the sanding member within a predetermined range
an enclosure;
a frame configured to fit within the enclosure, the plurality of printheads, the support member, and the surface treatment module being arranged vertically within the frame to position the surface treatment module at a position that has a gravitational potential within the enclosure that is lower than a gravitational potential at the plurality of printheads; and
a controller operatively connected to the plurality of printheads, the first actuator, and the second actuator, the controller being configured to operate the first actuator to move the object holder through the surface treatment module, to operate the surface treatment module to treat the surface of the object held by the object holder by operating the second actuator to rotate the sanding belt about the plurality of rollers, to operate the first actuator to pass the surface treated object past the plurality of printheads after the surface of the object has been treated, and to operate the plurality of printheads to eject marking material onto the object held by the object holder as the object holder passes the plurality of printheads.

13. The printing system of claim 12, the object holder further comprising:
an identification tag on a surface of the object holder that faces the movably mounted member;
the movably mounted member includes an input device for obtaining an identifier from the identification tag; and
the controller is operatively connected to the input device of the movably mounted member, the controller being further configured to operate the array of printheads, the firsts actuator, and the second actuator of the surface treatment module with reference to the identifier received from the input device of the movably mounted member.

14. The printing system of claim 13 further comprising:
at least one air nozzle configured to direct a stream of pressurized air towards the object to remove material released from the surface of the object; and
a receptacle positioned to receive the material removed by the stream of pressurized air from the at least one air nozzle.

15. The printing system of claim 14 further comprising:
an air knife positioned between the array of printheads and the abrasive device, the air knife being configured to form an air curtain between a volume in which the plurality of printheads is located and a volume within the surface treatment module.

16. A printing system comprising:
a plurality of printheads, each printhead in the plurality of printheads being configured to eject marking material;
a support member positioned to be parallel to a plane formed by the plurality of printheads;
a member movably mounted to the support member;
an actuator operatively connected to the movably mounted member to enable the actuator to move the moveably mounted member along the support member;
an object holder configured to mount to the movably mounted member to enable the object holder to pass the plurality of printheads as the moveably mounted member moves along the support member;
a surface treatment module configured to treat a surface of an object held by the object holder prior to the object holder passing the plurality of printheads, the surface treatment module comprising:
a retractable arm having a moving end and a fixed end;
an applicator mounted to the moving end of the retractable arm;
a source of solvent fluidly connected to the applicator;
an enclosure;
a frame configured to fit within the enclosure, the plurality of printheads, the support member, and the surface treatment module being arranged vertically within the frame to position the surface treatment module at a position that has a gravitational potential within the enclosure that is lower than a gravitational potential at the plurality of printheads; and
a controller operatively connected to the retractable arm, the plurality of printheads, and the actuator, the controller being configured to operate the actuator to move the object holder through the surface treatment module, to operate the surface treatment module to treat the surface of the object held by the object holder by operating the retractable arm to move the applicator into contact with the object held by the object holder to apply solvent from the source of solvent to the object, operating the actuator to move the object held by the object holder bidirectionally along the support member to enable the applicator to clean the object held by the object holder, operating the retractable arm to move the applicator out of contact with the object held by the object holder, to operate the actuator to pass the surface treated object past the plurality of printheads after the surface of the object has been treated, and to operate the plurality of printheads to eject marking material onto the object held by the object holder as the object holder passes the plurality of printheads.

17. The printing system of claim 16 further comprising:
a housing within which the applicator is mounted;
at least one pivoting member positioned at an open end of the housing, the at least one pivoting member being configured to open and close the open end of the housing selectively;
another actuator operatively connected to the at least one pivoting member; and
the controller being further configured to:
operate the other actuator to move the at least one pivoting member to open and close the open end of the housing selectively.

18. The printing system of claim 16, the object holder further comprising:
an identification tag on a surface of the object holder that faces the movably mounted member;
the movably mounted member includes an input device for obtaining an identifier from the identification tag; and
the controller is operatively connected to the input device of the movably mounted member, the controller being further configured to operate the array of printheads, the actuator, and the retractable arm of the surface treatment module with reference to the identifier received from the input device of the movably mounted member.

19. The printing system of claim 18 wherein the identification tag is a radio frequency identification (RFID) tag and the input device of the movably mounted member is a RFID reader.

20. The printing system of claim 18 wherein the identification tag is a bar code and the input device of the movably mounted member is a bar code reader.

* * * * *